(12) United States Patent
Jang et al.

(10) Patent No.: US 9,771,472 B2
(45) Date of Patent: Sep. 26, 2017

(54) UV HARDENING COMPOSITION HAVING IMPROVED LIGHT RESISTANCE, THREE DIMENSIONAL FILM AND METHOD FOR MANUFACTURING THE SAME

(71) Applicant: Hyundai Motor Company, Seoul (KR)

(72) Inventors: Seon-Ho Jang, Gyeonggi-Do (KR); Oh-Young Kwon, Choongchungbuk-Do (KR)

(73) Assignee: Hyundai Motor Company, Seoul (KR)

( * ) Notice: Subject to any disclaimer, the term of this patent is extended or adjusted under 35 U.S.C. 154(b) by 419 days.

(21) Appl. No.: 14/515,871

(22) Filed: Oct. 16, 2014

(65) Prior Publication Data

US 2015/0104624 A1 Apr. 16, 2015

(30) Foreign Application Priority Data

Oct. 16, 2013 (KR) .......................... 10-2013-123075

(51) Int. Cl.
| | |
|---|---|
| C08L 33/08 | (2006.01) |
| B05D 3/06 | (2006.01) |
| C08L 33/14 | (2006.01) |
| B05D 5/06 | (2006.01) |
| B44F 1/00 | (2006.01) |
| B29D 11/00 | (2006.01) |

(52) U.S. Cl.
CPC .............. *C08L 33/14* (2013.01); *B05D 5/061* (2013.01); *B05D 3/067* (2013.01); *B05D 2201/02* (2013.01); *B29D 11/00788* (2013.01); *B44F 1/00* (2013.01); *C08L 2201/08* (2013.01); *C08L 2203/16* (2013.01); *C08L 2205/03* (2013.01); *C08L 2312/06* (2013.01); *Y10T 428/24868* (2015.01)

(58) Field of Classification Search
CPC .................................................. C08L 2205/03
See application file for complete search history.

(56) References Cited

FOREIGN PATENT DOCUMENTS

| KR | 10-2011-136437 | 12/2011 |
|---|---|---|
| KR | 10-2011-0136437 A | 12/2011 |
| KR | 10-2013-0061301 A | 6/2013 |
| WO | 2010/079820 A1 | 7/2010 |

*Primary Examiner* — Ian Rummel
(74) *Attorney, Agent, or Firm* — Mintz Levin Cohn Ferris Glovsky and Popeo, P.C.; Peter F. Corless (57) ABSTRACT

Disclosed are a UV hardening composition having improved light resistance, a three dimensional film, and a method for manufacturing the three dimensional film. Particularly, the UV hardening composition having improved light resistance may be used in interior materials and the like for a vehicle which generally are substantially exposed to UV rays. In addition, the UV hardening composition may also be used for indoor electronic products. The UV hardening composition according to the present invention includes a urethane acrylate resin, a polyester acrylate resin, a UV absorber, a hindered amine light stabilizer (HALS), an antioxidant and the like. Further, the three dimensional film including the UV hardening composition may be advantageous due to the improvement in the carbon pattern three dimensional effect formed in the three dimensional film. Therefore, a comparable price and reduced weight of the three dimensional film for a vehicle interior material are available while maintaining the quality equivalent to a film to which an actual carbon fabric is used.

8 Claims, 4 Drawing Sheets

PRIOR ART

Fig. 1

PRIOR ART

UV HARDENING COMPOSITION HAVING IMPROVED LIGHT RESISTANCE, THREE DIMENSIONAL FILM AND METHOD FOR MANUFACTURING THE SAME

CROSS-REFERENCE TO RELATED APPLICATIONS

This application claims priority under 35 U.S.C. §119 to Korean Patent Application No. 10-2013-123075, filed on Oct. 16, 2013, in the Korean Intellectual Property Office, the disclosure of which is incorporated herein by reference in its entirety.

TECHNICAL FIELD

The present invention relates to a UV hardening composition having improved light resistance, a three dimensional film including the UV hardening composition, and a method for manufacturing the three dimensional film including the UV hardening composition. In particular, the UV hardening composition includes a UV absorber, a hindered amine light stabilizer (HALS) and the like, and thus, light resistance, three dimensional property and the like of the UV hardening composition and the three dimensional film may be improved.

BACKGROUND

Recently, a need for high-end interior materials of a vehicle has been steadily increasing. Accordingly, various technologies for the surface treatment which can give a three dimensional effect to the vehicle interior parts have been developed. Particularly, a film, in which a three dimensional effect has been implemented and which may be applied to the interior parts, has been intensively developed.

Figure 1:
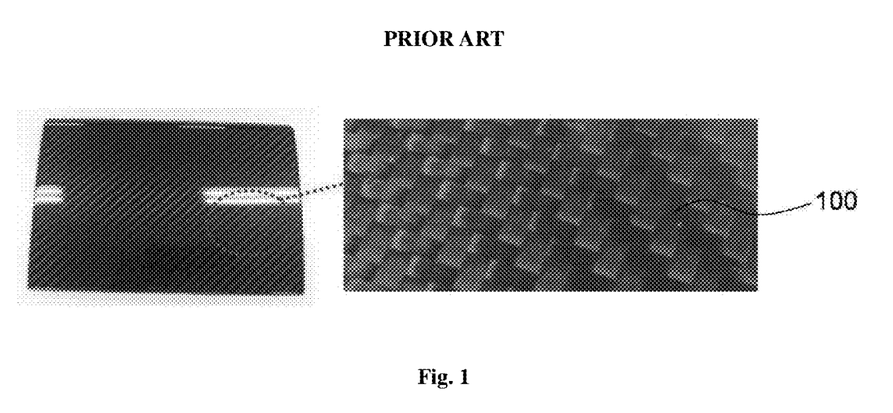
FIG. 1 are a photographic view and an enlarged view of an exemplary film including actual carbon fabric in the related art.
Figure 2:
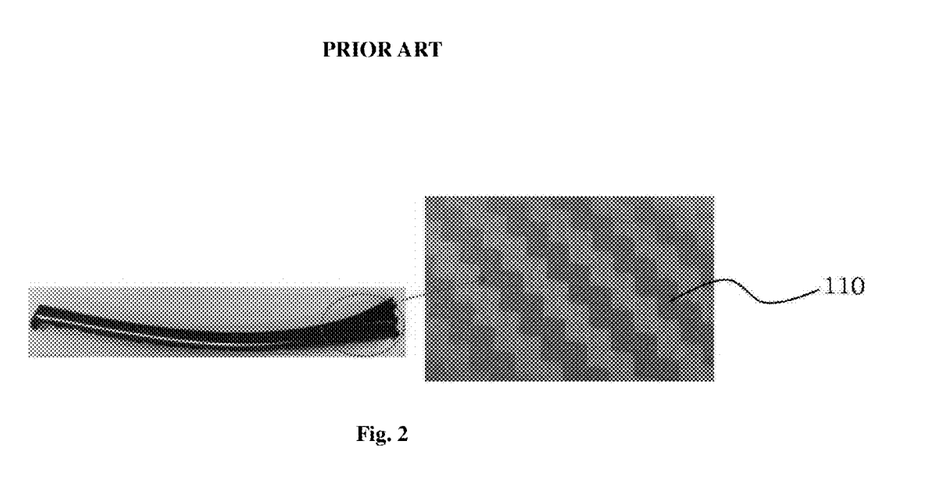
FIG. 2 are a photographic view and an enlarged view of an exemplary carbon printing film in the related art.

For example, a photographic view of a film including actual carbon fabric and an enlarged view of the same are shown in FIG. 1. In FIG. 2, a photographic view of a carbon printing film and an enlarged view of the same are also shown. One example of the films in the related art, in which the three dimensional effect is implemented, is a film to which a carbon pattern 100 including actual carbon fabric is applied in shown in FIG. 1. However, since the use of the film may be limited due to expensive manufacturing costs, the film may be applied only to high-end luxurious vehicles. Another type of film in which the three dimensional effect is implemented is a carbon printing film 110 as shown in FIG. 2. However, the three dimensional structure thereof may not appear on the rear surface of the film, and the texture of carbon fabric may not be implemented due to the insufficient three dimensional effect because carbon expression is conducted by two-dimensional printing.

In the related art, however, a film, by which a carbon pattern with a three dimensional structure may be materialized using a UV hardening composition, has been developed. In addition, a method for manufacturing a film in which a UV hardening composition may be applied to the rear surface portion of the film has been reported. In the method, a three dimensional structure may be obtained using UV rays. However, since the film may not have sufficient light resistance, such film may be generally applied to mobile phone key pads, mobile phone windows, remote controllers, touch panels, cosmetic containers and the like, but cannot be applied to interior materials of the vehicle and the like, because the vehicle interior materials require substantially high light resistance.

Further, Korean Patent Application Laid-Open No. 2005-11832 discloses a certain method for manufacturing a film for holography by forming a UV hardening composition layer on a plastic film has been reported. This certain method entails forming a fine unevenness pattern thereon by an embossing processing method, irradiating UV rays thereon to harden the composition layer, and then forming a metal deposition layer. However, the UV hardening composition is in the method is not also sufficient in terms of light resistance, and thus has cannot be limitation in being applied to the automobile vehicle interior materials and the like. The description provided above as a related art of the present invention is just merely for helping understanding of the background of the present invention and should not be construed as being included in the related art known by those skilled in the art.

SUMMARY OF THE INVENTION

In one aspect, the present invention a UV hardening composition having improved light resistance, three dimensional property and the like. The UV hardening composition may include a urethane acrylate resin, a polyester acrylate resin, a UV absorber, a hindered amine light stabilizer (HALS), an antioxidant and the like, in thereby improving which light resistance of the composition is improved by including a urethane acrylate resin, a polyester acrylate resin, a UV absorber, a hindered amine light stabilizer (HALS), an antioxidant and the like, and which. In particular, the UV hardening composition of the present invention may be applied to interior parts for an automobile a vehicle. In addition, the in which three dimensional patterns such as carbon pattern are expressed, and the like, a three dimensional film including the composition UV hardening and three dimensional patterns such as carbon patter is also provided. In another aspect, and the present invention provides a method for manufacturing the three dimensional film.

In an exemplary embodiment of the present invention provides, a UV hardening composition having improved light resistance, may include: an amount of about 5 to about 10 wt % of a urethane acrylate resin having a molecular weight of about 3,000 to about 7,000; an amount of about, 1 to about 10 wt % of a urethane acrylate resin having a molecular weight of about 7,000 to about 13,000; an amount of about 50 to about 65 wt % of a polyester acrylate resin; an amount of about 0.1 to about 3 wt % of a UV absorber; an amount of about 0.1 to about 1 wt % of a hindered amine light stabilizer (HALS); an amount of about 0.5 to about 5 wt % of an antioxidant, and the like, all said weight % amounts based on a total weight of the UV hardening composition.

In an exemplary embodiment, the UV hardening composition may further includes include: an amount of about 1 to about 10 wt % of hydroxyl dimethyl acetophenone, and an amount of about 0.05 to about 0.5 wt % of 2,4,6-trimethylbenzoyl-diphenylphosphine oxide, or combinations thereof, as a photoinitiator, said weight % amounts based on a total weight of the UV hardening composition.

In an exemplary embodiment, the UV hardening composition may further include: an amount of about 1 to about 10 wt % of tetrahydrofurfuryl acrylate (THFA), an amount of about 5 to about 20 wt % of isobornyl acrylate (IBOA), or combinations thereof as a photopolymerizable monomer, said weight % amounts based on a total weight of UV hardening the composition.

In an exemplary embodiment, the UV hardening composition may further includes: an amount of about 1 to about 5 wt % of a silane coupling agent, said weight % amount based on a total weight of UV hardening the composition.

In certain exemplary embodiments, the UV absorber may be, but not limited to, TINUVIN® 1130 and the like, and the hindered amine light stabilizer (HALS) may be, but not limited to, TINUVIN® 292 and the like.

Further, in yet certain further exemplary embodiment, the weight ratio of the UV absorber to the hindered amine light stabilizer may be in a range of about 1:1 to about 1:3.

In another certain exemplary embodiment, the silane coupling agent may include a functional group selected from the group consisting of a vinyl group, an epoxy group, a methacryloxy group, an amino group, and a mercapto group.

In other aspect, the present invention provides a three dimensional film including the UV hardening composition having improved light resistance according various exemplary embodiments of the present invention.

In an exemplary embodiment, the three dimensional film may include: a film layer which is disposed on an uppermost surface layer of the three dimensional film; a UV hardening composition layer which is in contact with one surface of the film layer; a deposition layer or metal printing layer which is in contact with one surface of the UV hardening composition layer; a protective printing layer which is in contact with one surface of the deposition layer or metal printing layer; and the like.

The film layer may protect the three dimensional film and maintains transparency, and may be formed from one selected from the group consisting of PET, PC, PMMA, PU and the like.

The UV hardening layer may be hardened by irradiating UV rays to form various patterns, and may include a UV hardening composition having improved light resistance. Particularly, the three dimensional property may be formed by the UV hardening layer.

The deposition layer or metal printing layer may make the three dimensional property of the UV hardening composition layer clear, and simultaneously, implement a desired color through deposition of metal or printing of a metal texture.

The protective printing layer may protect the deposition layer or metal printing layer.

In another aspect, the present invention provides a method for manufacturing the three dimensional film.

In an exemplary embodiment, the method may include steps of: a first step of positioning a film layer which is formed from one selected from the group consisting of PET, PC, PMMA, PU, and combination thereof on a mold on which a carbon pattern and the like may be formed; a second step of injecting a UV hardening composition layer having improved light resistance between the mold and the film layer; a third step of irradiating UV rays on the injected UV hardening composition layer while one surface of the UV hardening composition layer is in contact with the film layer and the other surface thereof adheres closely to a pattern of the mold, so that the UV hardening composition layer is hardened as the pattern of the mold and the pattern of the mold is transferred to the UV hardening composition layer; a fourth step of separating the UV hardening composition layer, to which the pattern is transferred, from the mold; a fifth step of forming a deposition layer or metal printing layer on one surface of the UV hardening composition layer to which the pattern is transferred; a sixth step of forming a protective printing layer on one surface of the deposition layer or metal printing layer; and the like.

According to various exemplary embodiments of the present invention, the UV hardening composition and the three dimensional film including the UV hardening composition may be applied to interior parts for a vehicle, which may be substantially exposed to UV rays, and to indoor electronic products due to improved light resistance obtained from a UV absorber, a hindered amine light stabilizer and the like in the hardening UV composition.

Furthermore, due to the improvement in the three dimensional property, clarity and the like of the three dimensional film in which the carbon pattern is implemented according to various exemplary embodiments of the present invention, a comparable price and reduced weight may be obtained while maintaining the quality equivalent to that of a film to which an actual carbon fabric is applied.

A vehicle interior part manufactured using the UV hardening composition is also disclosed in the present invention.

Other aspects of the invention are disclosed infra.

BRIEF DESCRIPTION OF THE DRAWINGS

The above and other objects, features and advantages of the present invention will be more clearly understood from the following detailed description taken in conjunction with the accompanying drawing, in which.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Terms or words used in the present specification and claims should not be interpreted as being limited to typical or dictionary meanings, but should be interpreted as having meanings and concepts, which comply with the technical spirit of the present invention, based on the principle that an inventor can appropriately define the concept of the term to describe his/her own invention in the best manner.

Hereinafter, the present invention will be described in detail.

The present invention provides a UV hardening composition having improved light resistance. The UV hardening composition may include a light stabilizer and the like. In addition, a three dimensional film including the UV hardening composition is provided.

In one aspect of the present invention, the UV hardening composition may include: a urethane acrylate resin, a polyester acrylate resin and the like as base resins, a UV absorber, a hindered amine light stabilizer (HALS) and the like as UV stabilizers, and an antioxidant and the like.

Further, the UV hardening composition may further include a photoinitiator, a photopolymerizable monomer, a silane coupling agent, and the like.

The urethane acrylate resin, as used herein, may be a mixture of a urethane acrylate resin having a molecular weight of about 3,000 to about 7,000, a urethane acrylate resin having a molecular weight of about 7,000 to about 13,000, and the like. In certain exemplary embodiment, the urethane acrylate resin may be a mixture of a urethane acrylate resin having a molecular weight of about 5,100 and a urethane acrylate resin having a molecular weight of about 10,000.

The urethane acrylate resin having a molecular weight of about 3,000 to about 7,000 may suppress color change to yellow of the UV hardening composition and improve flexibility thereof. The urethane acrylate resin having a molecular weight of about 7,000 to 13,000 may improve the chemical resistance and adhesive property of the UV hardening composition to a film layer 200 in FIG. 4.

In certain exemplary embodiments, the urethane acrylate resin having a molecular weight of about 3,000 to about 7,000 may be included in an amount of about 5 to about 10 wt % based on the total weight of the UV hardening composition. When the urethane acrylate resin is included in an amount less than about 5 wt %, flexibility of the composition and the like may not be sufficient and color changes to yellow may occur. On the contrary, when the urethane acrylate resin is included in an amount greater than about 10 wt %, hardening property, releasing property and the like of the UV hardening composition may deteriorate.

In yet certain exemplary embodiments, the urethane acrylate resin having a molecular weight of about 7,000 to about 13,000 may be included in an amount of about 1 to about 10 wt % based on the total weight of the UV hardening composition. When the urethane acrylate resin is included in an amount less than about 1 wt %, the adhesive property and chemical resistance of the composition may deteriorate, and on the contrary, when the urethane acrylate resin is present in an amount greater than about 10 wt %, viscosity of the composition may increase and the workability, hardening property and releasing property of the UV hardening composition may deteriorate.

The polyester acrylate resin, as used herein, may suppress color change to yellow of the UV hardening composition and improve the adhesive property and hardening property of the UV hardening composition to the film layer. In certain exemplary embodiments, and the polyester acrylate resin has a molecular weight of about 300 to about 1,000, or particularly of about 500.

Furthermore, an amount of about 50 to about 65 wt % of the polyester acrylate resin may be included in the UV hardening composition, based on the total weight of the UV hardening composition. When the polyester acrylate resin is included in an amount less than about 50 wt %, the adhesive property and hardening property of the composition may deteriorate, and the viscosity of the composition may be substantially low. On the contrary, when the polyester acrylate resin is included in an amount greater than about 65 wt %, the viscosity of the UV hardening composition may be extremely increased, and curling may occur.

In general, polymer compounds may decompose and age by the sunlight and the like as well as heat. Particularly, UV rays at a wavelength of about 250 to about 400 nm in the sunlight have high intensity of energy, and thus may cause discoloration, surface cracking, deterioration in mechanical properties and the like as well as decomposition of the polymer compound.

The UV stabilizer, as used herein, may prevent the polymer compound from decomposing by UV rays. The UV stabilizer may selectively absorb UV rays in the sunlight to convert the UV rays into heat energy, or annihilate free radicals and the like produced by UV rays.

The UV absorber, as used herein, may be one of the UV stabilizers and suppress the decomposition of the UV hardening composition by UV rays. Particularly, the UV absorber may absorb UV rays entering from the exterior and converting the UV rays into the IR rays, thereby releasing the energy as heat to the exterior. In certain exemplary embodiments, the UV absorber may absorb UV rays in the wavelength of about 250 to about 400 nm. Therefore, since the UV absorber suppresses the composition from being decomposed by UV rays, light resistance and the like of the composition may be improved.

Further, in yet certain exemplary embodiments, the UV absorber may be, but not limited to, hydroxyl benzophenone-based or benzotriazole-based UV absorbers. It is appreciated that TINUVIN® 1130 (manufactured by CIBA Geigy Co., Ltd., India) may provide a range of options for the UV absorber, but the examples are not limited thereto.

In another certain exemplary embodiments, the UV absorber may be included in an amount of about 0.1 to about 3 wt % based on the total weight of the UV hardening composition. When the UV absorber is included in an amount less than about 0.1 wt %, the capacity of absorbing UV rays may be substantially reduced and it may be difficult to protect the composition from UV rays. When the UV absorber is included in an amount more than about 3 wt %, the activity of the photoinitiator may be suppressed due to the excessive absorption of UV rays so that hardening of the composition may be hindered.

The hindered amine light stabilizer (HALS), as used herein, may be one of the UV stabilizers and annihilate the free radicals. As such, the free radicals produced in the UV hardening composition by photodecomposition of UV rays may not further cause chain reactions, and chain photooxidation reactions may not occur. Therefore, since the hindered amine light stabilizer (HALS) may suppress decomposition of the composition caused by free radicals and protect the surface of the composition, light resistance of the composition may be improved.

In certain exemplary embodiments, the hindered amine light stabilizer may be, but not limited to, a mixture of bis(1,2,2,6,6-pentamethyl-4-piperidyl)sebacate and methyl 1,2,2,6,6-pentamethyl-4-piperidyl sebacate. It is appreciated that TINUVIN® 292 (manufactured by CIBA Geigy Co., Ltd., India) may provide a range of options for the hindered amine light stabilizer, but the examples are not limited thereto.

Furthermore, in yet certain exemplary embodiments, the hindered amine light stabilizer may be included in an amount of about 0.1 to about 1 wt % based on the total weight of the UV hardening composition. When the hindered amine light stabilizer is included in an amount less than about 0.1 wt %, like the UV absorber, the capacity of absorbing UV rays may be substantially reduced and it may be difficult to protect the composition from UV rays. When the hindered amine light stabilizer is included in an amount greater than about 1 wt %, the activity of the photoinitiator may be suppressed due to the excessive absorption of UV rays so that hardening of the composition may be hindered.

Moreover, the weight ratio of the UV absorber to the hindered amine light stabilizer may be in a range of about 1:1 to about 1:3. When the weight ratio of the UV absorber to the hindered amine light stabilizer is less than 1, the synergistic effect of the UV absorber and the hindered amine light stabilizer may be reduced due to a relative reduction in the UV absorber. When the weight ratio of the UV absorber to the hindered amine light stabilizer is greater than 3, the activity of the photoinitiator may be suppressed due to the excessive absorption of UV rays so that hardening of the composition may be hindered.

The antioxidant, as used herein, may delay the composition from being hydrolyzed and degraded by UV rays and heat. In certain exemplary embodiments, the antioxidant may be, but not limited to, one or more selected from the group consisting of a phenol-based antioxidant, a phosphorus-based antioxidant, a sulfur-based antioxidant, and combinations thereof.

Further, the antioxidant may be included in an amount of about 0.5 to about 5 wt % based on the total weight of the UV hardening composition. When the antioxidant is included in an amount less than 0.5 wt %, it may be difficult to exhibit sufficient effects of preventing oxidation, and when the antioxidant is included in an amount greater more than 5 wt %, physical properties of the composition may deteriorate.

The photopolymerizable monomer, as used herein, may enhance adhesive property of the UV hardening composition, improve chemical resistance thereof, and suppresses color changes to yellow thereof. Furthermore, due to the photopolymerizable monomer, the viscosity of the UV hardening composition may be easily adjusted to improve workability.

In certain exemplary embodiments, the photopolymerizable monomer may be, but not limited to, tetrahydrofurfuryl acrylate (THFA), isobornyl acrylate (IBOA), or combinations thereof.

In yet certain exemplary embodiments, the tetrahydrofurfuryl acrylate used as the photopolymerizable monomer may have a molecular weight (MW) of about 156 and a glass transition temperature (Tg) of about −28° C. The tetrahydrofurfuryl acrylate may improve adhesive property of the UV hardening composition to the film layer 200 and reduce the viscosity of the composition by monofunctional groups.

In addition, the isobornyl acrylate used as the photopolymerizable monomer may have a molecular weight (MW) of about 222 and a glass transition temperature (Tg) of about 90° C. The isobornyl acrylate may reduce the contractibility of the composition and improve the abrasion resistance thereof.

In certain exemplary embodiments, the tetrahydrofurfuryl acrylate may be included in an amount of about 1 to about 10 wt % based on the total weight of the UV hardening composition. When the tetrahydrofurfuryl acrylate is included in an amount less than about 1 wt %, the adhesive property of the composition may be reduced, the viscosity thereof may increase, and the moldability thereof may deteriorate. When the tetrahydrofurfuryl acrylate is included in an amount greater than about 10 wt %, the hardening rate of the composition may be reduced and the amount of unreacted materials in the tetrahydrofurfuryl acrylate may increase.

Further, the isobornyl acrylate may be included in an amount of about 5 to about 20 wt % based on the total weight of the UV hardening composition. When the isobornyl acrylate is present in an amount less than about 5 wt %, the hardening reaction rate of the composition may be reduced and the chemical resistance thereof may deteriorate. When the isobornyl acrylate is included in an amount greater than about 20 wt %, the flexibility of the composition may be reduced so that curling may occur.

The photoinitiator, as used herein, may initiate a photopolymerization reaction by absorbing energy from the UV rays and form a hardening polymer material from the UV hardening composition. Particularly, the photoinitiator may absorb a wide range of UV rays in order to polymerize the UV hardening composition completely to the lower end portion of the layer.

In certain exemplary embodiments, the photoinitiator may be, but not limited to, hydroxy dimethyl acetophenone, 2,4,6-trimethylbenzoyl-diphenylphosphine oxide, or combinations thereof.

The hydroxy dimethyl acetophenone may absorb UV rays in a wavelength of about 250 to about 350 nm to produce free radicals and initiate a photopolymerization reaction. For example, the 2,4,6-trimethylbenzoyl-diphenylphosphine oxide absorbs UV rays in a wavelength of about 400 to about 450 nm to produce free radicals and initiate a photopolymerization reaction.

In particular, it is appreciated that Dacure® 1173 (manufactured by CIBA Geigy Co., Ltd., India) may provide a range of options for the hydroxy dimethyl acetophenone, and TPO® (manufactured by CIBA Geigy Co., Ltd., India) may provide a range of options for the 2,4,6-trimethylbenzoyl-diphenylphosphine oxide, but the examples are not limited thereto.

In yet certain exemplary embodiments, the hydroxy dimethyl acetophenone may be included in an amount of about 1 to 10 wt % based on the total weight of the UV hardening composition. When the hydroxy dimethyl acetophenone is included in an amount less than about 1 wt %, the hardening property of the composition may not be improved sufficiently, and when the hydroxy dimethyl acetophenone is present in an amount greater than about 10 wt %, the hardening reaction rate of the composition may increase, and the color change to yellow may occur.

In addition, the 2,4,6-trimethylbenzoyl-diphenylphosphine oxide may be included in an amount of about 0.05 to about 0.5 wt % based on the total weight of the UV hardening composition. When the 2,4,6-trimethylbenzoyl-diphenylphosphine oxide is included in an amount less than about 0.05 wt %, it may be difficult to harden the lower or inner portion of the composition, and when the 2,4,6-trimethylbenzoyl-diphenylphosphine oxide is present in an amount greater than about 0.5 wt %, the hardening reaction rate of the composition may increase, and the color change to yellow may occur.

As used herein, the silane coupling agent may improve the interfacial adhesion and secure adhesive property between the UV hardening composition and the deposition layer of the nonferrous metal and the metal printing layer. In certain exemplary embodiments, the silane coupling agent may be, but not limited to, a functional group selected from the group consisting of a vinyl group, an epoxy group, a methacryloxy group, an amino group, and a mercapto group.

Furthermore, in yet certain exemplary embodiments, the silane coupling agent may be included in an amount of about 1 to about 5 wt % based on the total weight of the UV hardening composition. When the silane coupling agent is included in an amount less than 1 wt %, it may be difficult to secure sufficient adhesive property and the like of the UV hardening composition. When the silane coupling agent is present in an amount greater than about 5 wt %, storability and the like of the UV hardening composition may deteriorate.

In other aspect, a three dimensional film including the UV hardening composition having improved light resistance is provided. Accordingly, the three dimensional film may have improved light resistance and the like. In addition, when the UV hardening composition having improved light resistance is disposed on the rear surface of the film, a three dimensional structure such as carbon pattern may be formed in the three dimensional film.

Figure 3:
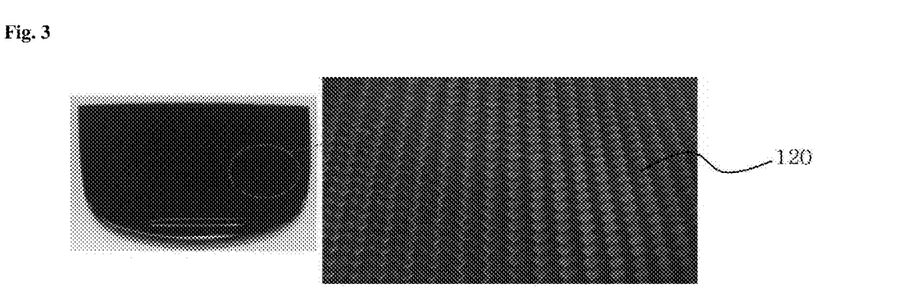
FIG. 3 are a photographic view and an enlarged view of an exemplary three dimensional film including an exemplary UV hardening composition according to an exemplary embodiment of the present invention.

FIG. 3 is a photographic view and an enlarged view thereof of an exemplary three dimensional film including the UV hardening composition according to an exemplary embodiment of the present invention. Various examples of the present invention may be applied to interior parts and the like for a vehicle for expressing a three dimensional pattern and the like such as a carbon pattern 120, as shown in FIG. 3.

Hereinafter, the present invention provides to a three dimensional film including a UV hardening composition having improved light resistance. Further, a method for manufacturing the three dimensional film is provided.

Figure 4:
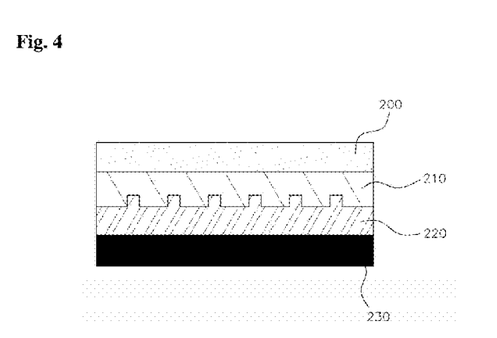
FIG. 4 schematically shows a cross-sectional view of an exemplary three dimensional film including the UV hardening composition according to an exemplary embodiment of the present invention.

In particular, FIG. 4 schematically shows a cross-sectional view of an exemplary three dimensional film including the UV hardening composition according to an exemplary embodiment of the present invention, The three dimensional film in an exemplary embodiment of the present invention will be described in detail with reference with the drawing.

As illustrated in FIG. 4, the three dimensional film may include: a film layer 200 which is disposed on an uppermost surface layer of the three dimensional film; a UV hardening composition layer 210 which is in contact with one surface of the film layer 200; a deposition layer or metal printing layer 220 which is in contact with one surface of the UV hardening composition layer 210; a protective printing layer 230 which, and is in contact with one surface of the deposition layer or metal printing layer 220; and the like.

The film layer 200 may protect the three dimensional film and maintains transparency, and may be formed from one selected from the group consisting of PET, PC, PMMA, PU and the like.

The UV hardening layer 210 may be hardened by irradiating UV rays to form various patterns, and include a UV hardening composition having improved light resistance. Particularly, the three dimensional property may be formed by the UV hardening layer.

The deposition layer or metal printing layer 220 may make the three dimensional property of the UV hardening composition layer 210 clear, and simultaneously, implement a desired color through deposition of metal or printing of a metal texture.

The protective printing layer 230 may protect the deposition layer or metal printing layer 220.

In certain exemplary embodiments, the three dimensional property, clarity and the like formed by the UV hardening composition layer 210, the deposition layer or metal printing layer 220 and the like may be further improved by a black color and the like. The black color and the like may be printed or colored on one surface and the like of the protective printing layer 230.

In another aspect, the method for manufacturing the three dimensional film is provided in detail.

In an exemplary embodiment, the method for manufacturing the three dimensional film may include steps of: a first step of positioning a film layer 200 formed from one selected from the group consisting of PET, PC, PMMA, and PU on a mold on which a carbon pattern and the like may be formed; a second step of injecting a UV hardening composition layer 210 having improved light resistance between the mold and the film layer 200; a third step of irradiating UV rays on the injected UV hardening composition layer 210 while one surface of the UV hardening composition layer 210 is in contact with the film layer 200 and the other surface thereof adheres closely to a pattern of the mold, so that the UV hardening composition layer 210 is hardened as the pattern of the mold and the pattern of the mold is transferred to the UV hardening composition layer 210; a fourth step of separating the UV hardening composition layer 210, to which the pattern is transferred, from the mold; a fifth step of forming a deposition layer or metal printing layer 220 on one surface of the UV hardening composition layer 210 to which the pattern is transferred; a sixth step of forming a protective printing layer 230 on one surface of the deposition layer or metal printing layer 220; and the like. In certain exemplary embodiments, in the first step, a layer and the like other than the film layer 200 may be additionally formed, if necessary. In yet certain embodiments, in order to further improve the three dimensional property, clarity and the like of the three dimensional film, a black color and the like may be printed or colored on the protective printing layer 230 in the sixth step.

Hereinafter, the present invention will be described in more detail through Examples. These Examples are only for illustrating the present invention, and it will be obvious to those skilled in the art that the scope of the present invention is not interpreted to be limited by these Examples.

Examples

Examples according to exemplary embodiments of the present invention and Comparative examples are prepared to test the light resistance as in the following Table 1.

TABLE 1

| Composition | Unit | Example 1 | Comparative Example 1 | Comparative Example 2 | Comparative Example 3 | Comparative Example 4 | Comparative Example 5 |
|---|---|---|---|---|---|---|---|
| Urethane acrylate resin (MW 5,100) | wt % | 8.4 | 8.4 | 8.4 | 8.4 | 8.4 | 8.4 |
| Urethane acrylate resin (MW 10,000) | wt % | 5 | 5 | 5 | 5 | 5 | 5 |
| Polyester acrylate resin | wt % | 60 | 63.5 | 60 | 60 | 60 | 60 |
| Photopolymerizable monomer (Tetrahydrofurfuryl acrylate) | wt % | 5 | 5 | 5 | 5 | 5 | 5 |
| Photopolymerizable monomer (Isobornyl acrylate) | wt % | 10 | 10 | 10 | 10 | 10 | 10 |
| Photoinitiator (CIBA-DC1173) | wt % | 5 | 5 | 5 | 5 | 5 | 5 |
| Photoinitiator (CIBA-TPO) | wt % | 0.1 | 0.1 | 0.1 | 0.1 | 0.1 | 0.1 |
| Silane coupling agent (Dow Corning-Silane) | wt % | 3 | 3 | 3 | 3 | 3 | 3 |
| UV Absorber (TINUVIN 1130) | wt % | 0.3 | 0 | 3.5 | 0 | 0 | 2.1 |
| Hindered amine light stabilizer (TINUVIN 292) | wt % | 0.2 | 0 | 0 | 3.5 | 0 | 1.4 |
| Antioxidant | wt % | 3 | 0 | 0 | 0 | 3.5 | 0 |

Table 1 shows exemplary UV hardening compositions in comparison to Comparative Examples. As shown in the Table above, the difference in compositions between the Example and the Comparative Examples is in the content of the UV absorber (TINUVIN® 1130) and the hindered amine light stabilizer (TINUVIN® 292) as UV stabilizers and the presence and absence of the antioxidant. The test results in light resistances of the test specimens are summarized in the following Table 2.

TABLE 2

| Time | Example 1 | Comparative Example 1 | Comparative Example 2 | Comparative Example 3 | Comparative Example 4 | Comparative Example 5 |
|---|---|---|---|---|---|---|
| 50 hr | 0.13 | 0.18 | 0.14 | 0.15 | 0.14 | 0.15 |
| 100 hr | 0.42 | 0.58 | 0.48 | 0.51 | 0.52 | 0.44 |
| 200 hr | 0.67 | 1.34 | 0.95 | 1.22 | 1.25 | 0.79 |
| 300 hr | 0.82 | 1.45 | 1.17 | 1.34 | 1.32 | 0.98 |
| 500 hr | 0.96 | 1.82 | 1.26 | 1.58 | 1.47 | 1.12 |

The light resistance was measured by using a xenon arc to irradiate light under the conditions of a black panel temperature of about 89±3° C., a bath humidity of about 50±5% RH and an irradiation illuminance of about 0.55±0.02 W/m² at a wave length of about 340 nm until the total cumulative light reached 700 KJ/m². Subsequently the test specimens were washed with a neutral detergent aqueous solution and dried by air. The chrominance values were measured over time courses, and the less chrominance value may present a better light resistance.

As a result of the light resistance test, Example 1 which includes the UV absorber, the hindered amine light stabilizer and the antioxidant, the chrominance value was measured in a substantially reduced value than those in the Comparative Examples after 200 hours had been elapsed. In other words, the change in color in Example 1 was smaller than that in the Comparative Examples even though Example 1 had been exposed to the UV rays longer than the Comparative Examples. Thus, the light resistance in Example 1 was better than those in the Comparative Examples. Further, since Example 1 according to an exemplary embodiment of the present invention has improved light resistance, it may be applied to interior materials of a vehicle.

Figure 5:
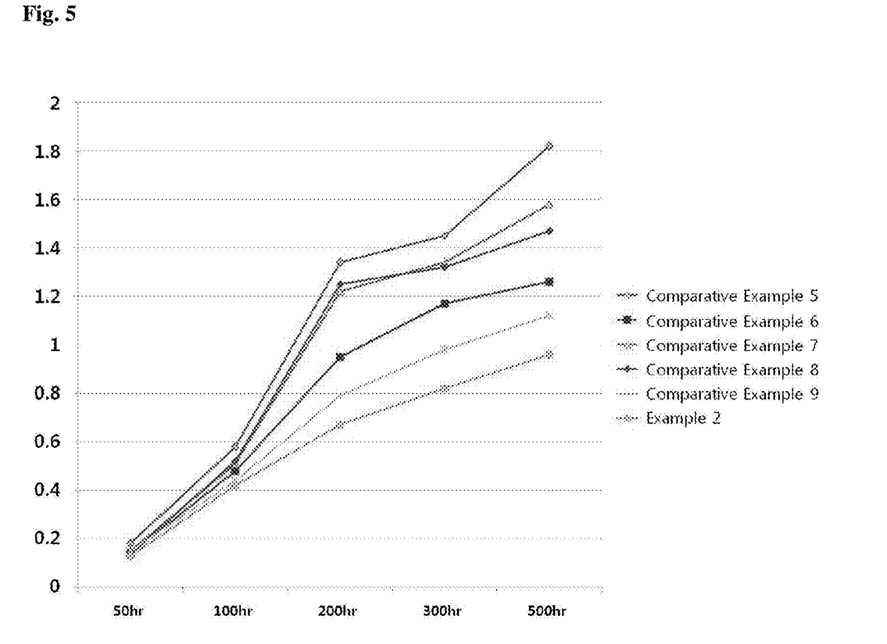
FIG. 5 is an exemplary graph showing light resistance test results from the Example according to an exemplary embodiment and the Comparative Examples.

In addition, FIG. 5 is an exemplary graph of the light resistance test results. The Example 1 in the Table has shown improved light resistance in FIG. 5.

Furthermore, in order to test other physical properties of exemplary UV hardening compositions having improved light resistance according to the present invention, the Example 1 and Comparative Examples were prepared as in the following Table 3.

TABLE 3

| Classification | Unit | Example 2 | Comparative Example 6 | Comparative Example 7 | Comparative Example 8 | Comparative Example 9 |
|---|---|---|---|---|---|---|
| Urethane acrylate resin (MW 5,100) | wt % | 8.4 | 0 | 13.4 | 15.9 | 4 |
| Urethane acrylate resin (MW 10,000) | wt % | 5 | 13.4 | 0 | 9.5 | 2.4 |
| Polyester acrylate resin | wt % | 60 | 60 | 60 | 48 | 67 |
| Photopolymerizable monomer (Tetrahydrofurfuryl acrylate) | wt % | 5 | 5 | 5 | 5 | 5 |
| Photopolymerizable monomer (Isobornyl acrylate) | wt % | 10 | 10 | 10 | 10 | 10 |
| Photoinitiator (CIBA-DC1173) | wt % | 5 | 5 | 5 | 5 | 5 |
| Photoinitiator (CIBA-TPO) | wt % | 0.1 | 0.1 | 0.1 | 0.1 | 0.1 |
| UV Absorber (TINUVIN 1130) | wt % | 0.3 | 0.3 | 0.3 | 0.3 | 0.3 |
| Hindered amine light stabilizer (TINUVIN 292) | wt % | 0.2 | 0.2 | 0.2 | 0.2 | 0.2 |
| Antioxidant | wt % | 3 | 3 | 3 | 3 | 3 |
| Silane coupling agent (Dow Corning-Silane) | wt % | 3 | 3 | 3 | 3 | 3 |

Physical properties of the Example and the Comparative Examples in Table 3 above were compared and are summarized in the following Table 4.

TABLE 4

| Classification | Example 2 | Comparative Example 6 | Comparative Example 7 | Comparative Example 8 | Comparative Example 9 |
|---|---|---|---|---|---|
| Light resistance | ⊚ | ○ | ⊚ | ○ | ○ |
| Initial adhesive property | ⊚ | ⊚ | ⊚ | ⊚ | ⊚ |
| Scratch resistance | ○ | ○ | ○ | ○ | Δ |
| Sun cream resistance | ○ | Δ | Δ | X | ○ |
| Moisture resistance | ⊚ | ⊚ | ⊚ | ⊚ | ⊚ |
| Abrasion resistance | ○ | ○ | Δ | Δ | ○ |
| Chemical resistance (Ethanol) | ○ | ○ | Δ | ○ | ○ |
| Chemical resistance (Gasoline) | ○ | ○ | ○ | ○ | ○ |

⊚: Excellent
○: Good
Δ: Normal
X: Weak

The physical properties of the Example 2 and Comparative Examples were compared. In particular, the Comparative Examples included the urethane acrylate resin having a molecular weight of 5,100 and the polyester acrylate resin, which are out of the content ranges of the components of the present invention.

The light resistance was measured by using a xenon arc to irradiate light under the conditions of a black panel temperature of about 89±3° C., a bath humidity of about 50±5% RH and an irradiation illuminance of about 0.55±0.02 W/m² at a wavelength of about 340 nm until the total cumulative light reached 700 KJ/m². Subsequently, the test specimens were taken out, washed with a neutral detergent aqueous solution and dried by air. The appearance of the test species was evaluated and the adhesive property was measured.

The initial adhesive property was measured by performing a cross-cut on the Example and the Comparative Examples for each 11 cut at an interval of 2 mm in the horizontal and vertical directions in accordance with the standard ASTM D3359 tape adhesive property test method. The surfaces of the Example and the Comparative Examples were cleaned with a soft brush, the surfaces of the Example and the Comparative Examples were firmly adhered with a predetermined tape having suitable width and length, and the tapes were strongly peeled off while maintaining an angle of 90 degrees with the surface to observe the degree of the peeled-off part.

The scratch resistance was measured by applying a load of about 500 g to a sapphire tip having a shape of about 0.5 R to generate scratches on the surface at a rate of about 100 mm/sec.

For the sun screen resistance, 0.25 g of commercially available sun screen was applied to the entire surfaces of the Example and the Comparative Examples, the test specimens were left to stand at about 80±2° C. in a constant temperature bath for 1 hour. Subsequently, the test specimens were taken out from the bath, and left to stand at room temperature for about 10 to 15 minutes. Afterwards, the sun screen applied on the test specimens was washed off with a neutral detergent and the test specimens were dried. Moreover, the surface state of the Example and the Comparative Examples was investigated, and adhesive property was measured three times by the initial adhesive property test method.

For the moisture resistance, adhesive property was measured by leaving the Example and the Comparative Examples to stand in a chamber under the conditions of a test temperature of about 50±2° C. and a relative humidity of about 95±2% RH for about 168 hours. The test specimens were taken outs, and the appearance of each test specimen was evaluated and the adhesive property was measured as described above.

The abrasion resistance was measured by using a canvas (TOYOSYNTHETIC CH 2010) to perform a shuttle test on the top surfaces of the Example and the Comparative Examples for about 10,000 times while maintaining the distance of about 100±5 mm at a rate of about 60 shuttles/min and a load of about 1 kg applied on the Example and the Comparative Examples. Subsequently, the appearance of each test specimen was evaluated and the degree of the surface abrasion of the test specimens were measured.

For the chemical resistance, cotton cloth wetted with ethanol (purity 95% or more) or gasoline was shuttled for about 10 times with a force of about 4.9 N (or about 0.5 kgf) on the surfaces of the Example and the Comparative Examples, and then the appearances of the Example and the Comparative Examples were observed. Thereafter, the chemical resistance was measured by leaving the test specimens to stand at room temperature for about 1 hour, leaving the test specimens to stand in a constant temperature chamber under the condition of about 80±2° C. for about 3 hours. Subsequently, the test specimens are taken out of the chamber to observe the surface state thereof.

In contrast to the results from the Comparative Examples including the urethane acrylate resin or the polyester acrylate resin which are out of the content ranges according to the present invention, the Example 2 in Table 3 above according to an exemplary embodiment of the present invention had improvement in all the physical properties including light resistance. Therefore, the Examples of the present invention may be used in automobile interior materials than the Comparative Examples.

As described above, the present invention has been described in relation to various exemplary embodiments of the present invention, but this is only illustration and the present invention is not limited thereto. The exemplary embodiments described may be changed or modified by those skilled in the art to which the present invention pertains without departing from the scope of the present invention, and various alterations and modifications are possible within the technical spirit of the present invention and the equivalent scope of the claims to be described below.

What is claimed is:

1. A UV hardening composition having improved light resistance, comprising:
    an amount of about 5 to about 10 wt % of a urethane acrylate resin having a molecular weight of about 3,000 to about 7,000,
    an amount of about 1 to about 10 wt % of a urethane acrylate resin having a molecular weight of about 7,000 to about 13,000,
    an amount of about 50 to about 65 wt % of a polyester acrylate resin,
    an amount of about 0.1 to about 3 wt % of a UV absorber,
    an amount of about 0.1 to about 1 wt % of a hindered amine light stabilizer (HALS), and
    an amount of about 0.5 to about 5 wt % of an antioxidant,
    all said weight % amounts based on a total weight of the UV hardening composition.

2. The UV hardening composition having improved light resistance of claim 1, further comprising:
    an amount of about 1 to about 10 wt % of hydroxyl dimethyl acetophenone and an amount of about 0.05 to about 0.5 wt % of 2,4,6-trimethylbenzoyl-diphenyl-phosphine oxide as a photoinitiator, wherein said weight % amounts are based on total weight of the UV hardening composition.

3. The UV hardening composition having improved light resistance of claim 2, further comprising:
    an amount of about 1 to about 10 wt % of tetrahydrofurfuryl acrylate (THFA) and an amount of about 5 to about 20 wt % of isobornyl acrylate (IBOA) as a photopolymerizable monomer, wherein said weight % amounts are based on total weight of the UV hardening composition.

4. The UV hardening composition having improved light resistance of claim 2, further comprising:
    an amount of about 1 to about 5 wt % of a silane coupling agent wherein said weight % amount is based on total weight of the UV hardening composition.

5. The UV hardening composition having improved light resistance of claim 1, wherein the UV absorber is TINUVIN® 1130 and the hindered amine light stabilizer (HALS) is TINUVIN® 292.

6. The UV hardening composition having improved light resistance of claim 1, wherein the weight ratio of the UV absorber to the hindered amine light stabilizer is in a range of about 1:1 to about 1:3.

7. The UV hardening composition having improved light resistance of claim 4, wherein the silane coupling agent comprises a functional group selected from the group consisting of a vinyl group, an epoxy group, a methacryloxy group, an amino group, and a mercapto group.

8. A vehicle interior part manufactured using the UV hardening composition of claim 1.

* * * * *